US008085618B2

(12) United States Patent
Jean et al.

(10) Patent No.: US 8,085,618 B2
(45) Date of Patent: Dec. 27, 2011

(54) SONAR WITH DEFORMABLE, FLEXIBLE ANTENNA AND ASSOCIATED METHOD OF SIGNAL PROCESSING TO FORM A SYNTHETIC ANTENNA

(75) Inventors: Frédéric Jean, Meounes les Montrieux (FR); Yann Cottreau, Le Beausset (FR)

(73) Assignee: IXBLUE, Marly-le-Roi (FR)

( * ) Notice: Subject to any disclaimer, the term of this patent is extended or adjusted under 35 U.S.C. 154(b) by 396 days.

(21) Appl. No.: 12/440,545

(22) PCT Filed: Sep. 7, 2007

(86) PCT No.: PCT/FR2007/051891
§ 371 (c)(1),
(2), (4) Date: Mar. 9, 2009

(87) PCT Pub. No.: WO2008/029068
PCT Pub. Date: Mar. 13, 2008

(65) Prior Publication Data
US 2010/0014385 A1 Jan. 21, 2010

(30) Foreign Application Priority Data

Sep. 8, 2006 (FR) ...................... 06 53647

(51) Int. Cl.
*G01S 15/00* (2006.01)
(52) U.S. Cl. ........................................ 367/88
(58) Field of Classification Search .............. 367/88, 367/89, 130
See application file for complete search history.

(56) References Cited

U.S. PATENT DOCUMENTS

| 3,713,082 | A | * | 1/1973 | Menoche | 367/128 |
| 4,088,978 | A | * | 5/1978 | Gilmour | 367/88 |
| 4,204,210 | A | * | 5/1980 | Hose | 342/25 A |
| 4,608,571 | A | * | 8/1986 | Luly | 343/781 P |
| 4,930,111 | A | | 5/1990 | Sullivan | |
| 4,987,563 | A | * | 1/1991 | Gilmour | 367/88 |
| 5,058,082 | A | * | 10/1991 | Bertheas et al. | 367/130 |
| 5,117,400 | A | | 5/1992 | Penn | |
| 5,528,554 | A | * | 6/1996 | Posch et al. | 367/12 |
| 5,886,950 | A | * | 3/1999 | Billon | 367/88 |
| 6,215,730 | B1 | * | 4/2001 | Pinto | 367/88 |

(Continued)

FOREIGN PATENT DOCUMENTS

EP 0600242 6/1994

(Continued)

OTHER PUBLICATIONS

International Search Report dated Feb. 19, 2008, in PCT application.

*Primary Examiner* — Thomas Tarcza
*Assistant Examiner* — James Hulka
(74) *Attorney, Agent, or Firm* — Young & Thompson

(57) ABSTRACT

A sonar system includes at least one transmitter and one flexible antenna including a plurality of sections articulated one after the other, each section being provided with at least one acoustic receiver. The system is equipped with positioning elements making it possible to determine the instantaneous position of each of the receivers, and calculation elements making it possible to reconstruct an image of the seabed by taking account of the instantaneous micromovements of each of the receivers.

13 Claims, 1 Drawing Sheet

U.S. PATENT DOCUMENTS

| | | | |
|---|---|---|---|
| 6,240,050 B1 * | 5/2001 | Pinto | 367/11 |
| 6,847,588 B1 * | 1/2005 | Wallace et al. | 367/129 |
| 6,943,738 B1 * | 9/2005 | Mattsson et al. | 343/700 MS |
| 2004/0047236 A1 * | 3/2004 | Billon | 367/88 |
| 2004/0125701 A1 * | 7/2004 | Raillon et al. | 367/106 |
| 2006/0109743 A1 * | 5/2006 | Kosalos et al. | 367/88 |
| 2006/0146647 A1 * | 7/2006 | Billon | 367/88 |
| 2007/0123122 A1 * | 5/2007 | Puzella et al. | 441/11 |
| 2008/0008031 A1 * | 1/2008 | Vigen et al. | 367/15 |
| 2009/0175128 A1 * | 7/2009 | Jean et al. | 367/88 |

FOREIGN PATENT DOCUMENTS

| | | |
|---|---|---|
| FR | 2729041 | 7/1996 |
| FR | 2738919 | 3/1997 |

* cited by examiner

SONAR WITH DEFORMABLE, FLEXIBLE ANTENNA AND ASSOCIATED METHOD OF SIGNAL PROCESSING TO FORM A SYNTHETIC ANTENNA

CROSS-REFERENCE TO RELATED APPLICATIONS

The instant Application claims priority to PCT/FR2007/051891 filed Sep. 7, 2007 and French Application 0653647 filed Sep. 8, 2006.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

1. Field of the Invention

The invention pertains to the field of sonar imaging in marine environment. More particularly, the invention relates to an improved sonar and an associated method of signal processing.

2. Description of Related Art

It is known to "light" the seafloor of which is to be imaged or a submarine target which is to be located with an acoustic pulse, and to listen the time signal generated by the reverberation of the emitted acoustic pulse.

To this end, it is known to use a submarine apparatus, or fish, towed by a surface ship. The flanks of the fish each carry sonars, knows as "lateral sonars". The acoustic antenna of each of these lateral sonars is formed by a row of several transducers operating in reception, associated with at least one transducer operating in transmission. When submerged to take an image of the seafloor, the fish navigates in such a way to be positioned for example about thirty meters above the seafloor in order to image up to a range of 300 meters. More generally, the fish navigates at a height above the seafloor which corresponds to about 10% of the maximum range of observation. Thus, each lateral sonar makes it possible to observe of a seafloor strip running lengthwise parallel to the moving trajectory of the fish and widthwise in a vertical plane transversal to the trajectory of the fish, within an angular sector originating from the sonar and extending generally between 30° and 80° with respect to the vertical.

Now, the resolution of a sonar, at a given working frequency, substantially depends on the length of the receiving antenna. Thus, to improve the resolution of sonars, the purpose has been, in a first time, to increase the length of their antenna. But the increase of the antenna length is limited by the supporting-fish size. Therefore, it is difficult to make an antenna longer than about 3 m because of the fish bulk aboard the surface ship, and especially because of the difficulties for launching and recovering the fish. Consequently, several means for lengthening the antenna have been proposed.

FR2738918 discloses a synthetic-aperture sonar system which makes it possible, thanks to signal processing device and method, to obtain a virtual antenna greater than the physical antenna, for example about 30 m for the virtual antenna whereas the physical antenna is about 3 m.

However, these device and process imply a limitation of the carrier speed, which must stay lower than half the length of the antenna by recurrence, typically 5 knots for an antenna of 2 m and a range of 300 m.

For example, U.S. Pat. No. 5,747,724 discloses a sonar system intended for seismic studies, having an antenna that is initially folded up inside the body of a submarine towing means and that can be unfolded and towed behind the towing means, which itself can be towed by a surface ship. The antenna consists of a series of acoustic sensors connected to each other by a supporting cable. At the front end of the antenna, a telemetric unit is linked to the towing means by a communication cable.

Such telemetric unit comprises the necessary electronics for multiplexing the signals coming from each of the acoustic sensors and for relaying the multiplexed signal to the towing means, through the communication cable. At the rear end of the antenna, on the side opposite to the towing means, a floating anchor, with a substantial drag, enables the antenna supporting cable to be strained when the towing means moves along, whereby the acoustic sensors are kept in a rigid relative position, essentially rearward, along the trajectory of the towing means.

U.S. Pat. No. 5,747,724 discloses a foldable-antenna sonar that effectively makes it possible to no longer have to use a supporting fish and thus to reduce the bulk of the system, to simplify the launching operations and to be able to construct a great-size antenna having theoretically a very good resolution.

However, when the towing means moves along a trajectory, the described antenna can not be considered as a solid. This antenna has not really a rectilinear shape constant in time, unlike the hypothesis made in U.S. Pat. No. 5,747,724. So, each acoustic sensor is animated with instantaneous movements moving it away from a followed trajectory. These movements result in a degradation of the sonar properties with respect to those expected, and in particular a low resolution, which can be acceptable for applications such as seismic research, in which the working wavelength is of the order of 10 cm or greater, but is not acceptable for smaller wavelengths such as those used for lateral sonars.

One also knows with U.S. Pat. No. 5,117,400 a towed antenna of transducers with an optical calibration which allows to compensate for antenna deviations and U.S. Pat. No. 4,930,111 an overlap correlation processor for a synthetic antenna.

The interest of a deformable-antenna sonar being admitted, there thus exists a need for such an improved deformable-antenna sonar system making it possible to solve the above-mentioned problems, and in particular to effectively obtain high resolutions.

BRIEF SUMMARY OF THE INVENTION

To this end, the invention has for object a sonar system comprising: a physical antenna consisting of a plurality of receivers; at least one transmitter; a calculation unit. The sonar system according to the invention is characterized in that the physical antenna is deformable and includes acoustic receivers having variable positions relative to each other, and in that the system is equipped with positioning means making it possible to determine, in real time, the instantaneous position of each of the receivers, and in that the calculation unit makes it possible to reconstruct a sonar image by taking account of instantaneous positions of each receiver.

In an embodiment, the instantaneous position of a receiver is given by three positioning coordinates and three angular orientation coordinates.

Preferably, the deformable antenna is connected to the rear of a towed head, the head being provided with an inertial unit adapted to determine the instantaneous position and orientation of the head, and the deformable antenna is equipped with sensors making it possible to determine a relative instantaneous position of the transmitter and of each transducer with respect to the head.

Preferably, the calculation unit makes it possible to form a synthetic antenna by considering a succession of K operation recurrences of the sonar system.

Still preferably, the deformable antenna includes more than 24 receivers and has a length greater than or equal to 2 m.

The invention has also for object a method of sonar imaging for processing a plurality of time signals obtained at the output of a plurality of acoustic receivers of a physical antenna, respectively, during the detection of the reflection of at least one wave emitted by an acoustic transmitter, the time signals being collected by a calculation unit adapted to implement the method. The method is characterized in that, the physical antenna being a deformable antenna, the method comprises determining, in real time, the instantaneous position of each of the plurality of receivers and the position of the transmitter at the time of emission, then compensating, at each instant of time, the phase of each time signal for the phase variation due to the movements of the transmitter and of the receiver generating the signal, so as to determine a plurality or corrected time signals, and determining the amplitude modulation of a point to be imaged according to the mutual constructive and destructive interferences of the different corrected time signals.

Preferably, the time signals are associated not only with each receiver, but also with each operation recurrence of the sonar system, whereby a synthetic antenna is formed.

Advantageously, according to the invention, the positions of each of the transducers of the deformable antenna are determined in real time. Based on this information, suitable signal processing means reconstruct an image equivalent to that which could be obtained by means of an equivalent-sized rigid linear antenna.

BRIEF DESCRIPTION OF THE SEVERAL VIEWS OF THE DRAWINGS

The invention will be better understood and other purposes, details, features and advantages thereof will become more clearly apparent from the description of a particular embodiment of the invention which is given merely by way of illustrative and non-limitative example with reference to the appended drawings. In these drawings:

As shown in FIG. 1A, a surface ship 1 tows, by means of a cable 2, a sonar 3 having a deformable antenna. The sonar 3 comprises a head 4 and a deformable antenna 5.

DETAILED DESCRIPTION OF THE INVENTION

Figure 1A:
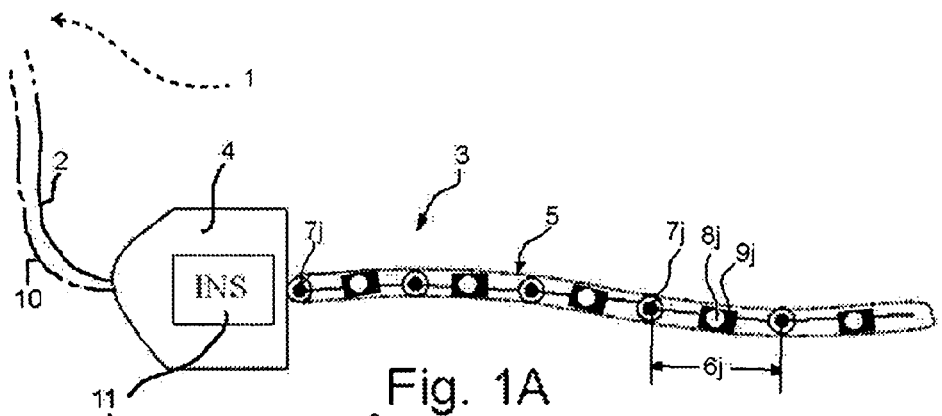
FIGS. 1A-C are schematic views of the physical part of the sonar system according to the invention, in three different embodiments.

According to the first embodiment shown in FIG. 1A, the flexible antenna 3 is formed of a plurality of N sections $6_j$ coupled one after the other by as many ball joint $7_j$. Each section $6_j$ is provided with a transducer $8_j$ as well as an associated low-level piece of electronics $9_j$ making possible emission and/or reception of an acoustic signal in the surrounding environment. The communication from the piece of electronics $9_j$ of a given section $6_j$ to the head 4, or from the head 4 to at least one piece of electronics $9_j$ of a given section $6_j$, is made possible by the presence of suitable communication means. These communication means are preferably electric cables, but, in a variant, they could be optical fibres or means for communicating through electromagnetic or acoustic waves of small range between emission/reception means on the head 4 and emission/reception means fitting each of the sections $6_j$.

The sonar 3 is in uplink and downlink communication with the surface ship 1 through an umbilical cord 10. In this case, the head 4 of the sonar comprises only means for emitting the collected information from the different sections $6_j$ to the surface ship 1, possibly with amplification, and for emitting the downlink signals from the surface ship 1 to the corresponding section $6_j$, for example.

In this first embodiment, the head 4 of the sonar 3 is also equipped with an inertial unit 11. The inertial unit 11 makes it possible, by measuring the linear accelerations and the angular rotation speeds, to determine the position of the head 4 at each instant of time: three positioning coordinates of a reference point, such as the centre of gravity of the head 4, and three attitude angular coordinates of a reference mark linked to the head 4 with reference to an inertial reference frame.

Moreover, each ball joint $7_j$ between two consecutive sections $6_{j-1}$ and $6_j$ is instrumented so as to measure the three angles corresponding to the three degrees of freedom between the two considered sections. The different angular sensors located at the ball joints $7_j$ measure instantaneous angular information, as an angle or an angular speed, which are communicated to the head 4 of the sonar 3 by the above-described means.

It will be noticed that, in embodiment variants, the ball joint $7_j$ can have fewer degrees of freedom. For example, the ball joint can be a pivot-type link whose axis is oriented so as to be substantially vertical during the use of the sonar 3. Consequently, the number of instantaneous angles and/or angular speeds to be measured is reduced. For example, in the case of a pivot link, only one angle and/or angular speed has to be measured at each instant of time to know the relative position of the section $6_j$ with respect to the section $6_{j-1}$.

The information generated by the inertial unit as well as the different angular information coming from each ball joint $7_j$ are transmitted along the umbilical cord 10 toward the surface ship 1, where suitable calculation means 15 enable the information to be processed according to a method which will be described latter.

The calculation means 15 comprise a calculation unit and a storage unit. The storage unit stores the value of different variables or parameters as well as commands coming from different programs and adapted to be executed by the calculation unit. In the most preferable embodiment, among the different stored programs, a program exists that allows implementation of the signal processing method according to the invention.

In a simplified manner, it is understood that the inertial unit 11 makes it possible to know precisely, for example, the position of the centre of gravity of the head 4 of the sonar 3 and the orientation of said head in an inertial reference frame having the centre of gravity as origin. A translational displacement of a known length along an also-known direction makes it possible to determine the position of the ball joint $7_1$ linking the head to the head-side end of the deformable antenna 5. Based on the angular information given by the sensors located on the ball joint $7_1$, the instantaneous position and orientation of the section $6_1$ and of the transducer $8_1$ are determined. The instantaneous position of the ball joint $7_2$ is also determined. The angular information given by the sensors located on the ball joint $7_2$ make it possible to determine, by an iterative process, the instantaneous position and orientation of the section $6_2$ and of the transducer $8_2$, as well as the position of the ball joint $7_3$. The instantaneous position and orientation of each of the transducers are gradually determined.

Thus, during the reception of the echo signal reflected by a submarine relief, for example, the successive instantaneous shapes of the antenna are fully determined. The time signal received by each of the sensors $8_i$ is then processed, taking into account this succession of instantaneous shapes. Consequently, according to the invention, the instantaneous positions of the antenna are taken into account to generate the seafloor image.

In more details, the sonar system functions in a periodical manner. For a maximal range of 300 meters, the operation recurrences are separated from each other by a duration of about 400 milliseconds. During one recurrence, the antenna first emits an acoustic pulse having a typical frequency of 100 kHz and a very short duration of the order of 10 ms. Then, during the rest of the recurrence, the antenna functions as a receiver and listens to the acoustic wave reverberated by the ground of the seafloor or by submarine objects. During said operation as a receiver, the antenna deforms. The position of each section $6_i$ slightly changes, which affects the time signal detected by the associated transducer $8_i$. Thus, it is necessary to process the measured signal to separate, on the one hand, the contributions from the echo source, and on the other hand, those from the displacement of the transducer generating said signal.

With each recurrence i of a series of R recurrences required for the formation of a synthetic antenna, and with each sensor j among the N sensors forming the flexible physical antenna, are associated a time signal $S_{i,j}(t)$ and a position $C_{i,j}(t)$, where t varies from 0 to T, T being the duration of a recurrence.

Figure 2:
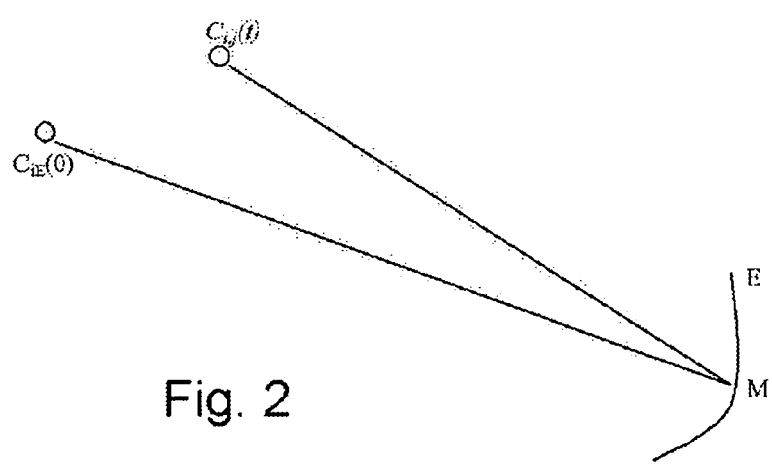
FIG. 2 is a geometrical view of the physical situation taken into account by the signal processing method according to the invention.

The signal $S_{i,j}(t)$ is the sum of all the contributions from the seafloor portion that is insonified:

$$S_{i,j}(t) = \int_{M \in E} P_M$$

where M is a point belonging to the intersection between the seafloor and the ellipsoid. This ellipsoid is defined by the focuses $C_{i,E}(0)$, which is the position of the transmitter E at t=0, i.e. at the time of emission, and $C_{i,j}(t)$, which is the position of the $j^{th}$ receiver at the instant of time t, as well as the constraint on the position $C_{i,j}(t)$ translated by the following relation between the distances (cf. FIG. 2):

$$d(C_{i,E}(0), M) + d(C_{i,j}(t), M) = c^* t$$

where c is the sound propagation speed in sea water.

The contribution $P_M$ of each point M is principally a phase shift and an amplitude modulation of the emitted signal $S_E$:

$$P_M = A_M \cdot e^{i\phi_M} \cdot S_E$$

The amplitude modulation $A_M$ is specific to the point M, whereas the phase shift $\phi_M$ depends on the relative position of the emission point $C_{i,E}(0)$, the reflexion point M and the detection point $C_{i,j}(t)$.

The purpose of the processing is to calculate the amplitude modulation $A_M$ of each point M of the ground, and to display the result on a screen, to record it, or to make any other use of it. To this end, each signal $S_{i,j}(t)$ is first phase-corrected by compensating for the phase shift, which is a function of the time, generated by the trip of the signal between the position of the transmitter at the time of emission and the position of the sensor j at the instant of time t. This instantaneous phase shift is known from the points $C_{i,E}(0)$, $C_{i,j}(t)$ and M. In result, phase-corrected signals $S'_{i,j}(t)$ are obtained.

Then, in a second time, the amplitude modulation $A_M$ is evaluated from the constructive and destructive interferences of these phase-corrected signals $S'_{i,j}(t)$.

Although the invention has been described with reference to a particular embodiment, it is not limited to this embodiment. It includes all technical equivalents to the described means as well as the combinations thereof that are within the scope of the invention.

Figure 1B:
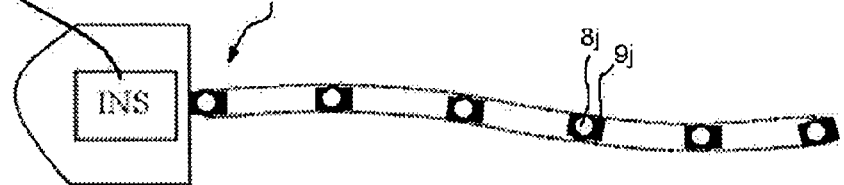

Thus, FIG. 1B shows a variant in which the different sections of the antenna are inserted inside a tube or sheath 15. This tube can be filled with a gel enabling a good transfer of the acoustic energy from the outside toward the transducers or vice versa. In this case, the deformable antenna is flexible. The sensors making it possible to know the instantaneous position of the corresponding transducer are located close to the receivers. The deformation of the antenna can be approximated more precisely by a polynomial form extrapolating the instantaneous positions measured by the different sensors. Consequently, the number of sensors necessary to determine the instantaneous deformation of the antenna is reduced.

Figure 1C:
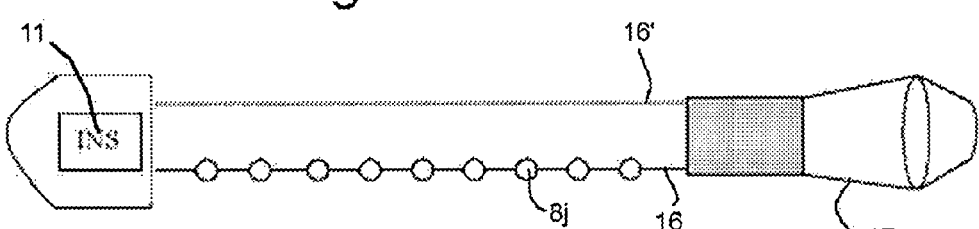

In FIG. 1C, a streamer is made up of a lower cable 16 and an upper cable 16' fastened to a head 4. The different transducers are carried by the lower cable 16 serving as a support. A floating anchor 17 fastened at the end of the streamer allows the latter to be strained when the head is moved by towing. The instantaneous deformation of the antenna is determined by the use of a means for positioning precisely the floating anchor 17 with respect to the head 4 without having to instrument each of the transducers.

Of course, this deformable antenna can be used over several recurrences so as to form a synthetic antenna. In particular, the use of a very long physical antenna makes it possible to increase the moving speed of the sonar. Indeed, for synthesizing an antenna, the rear part of the physical antenna in the following recurrence has to coincide with the front part of the physical antenna in the previous recurrence. This partial overlapping of the physical antenna between two successive recurrences makes it possible to correlate the obtained signals and to synthesize an antenna. Consequently, it is necessary that, between two successive recurrences, the moving speed of the antenna is not greater than half the length of the antenna divided by the period T of a recurrence. By means of the prior art antennas, the maximal moving speed is of about 4 knots. According to the invention, having physical antennas of great size makes it possible to increase the moving speed of the antenna for making a synthesis. Thus, the use of such an antenna makes it possible to map of a site, not only more precisely but also much more quickly.

The invention claimed is:

1. A sonar system comprising:
a physical antenna consisting of a plurality of receivers;
a calculation unit;
said physical antenna being deformable, said physical antenna being flexible, and including acoustic receivers having variable positions relative to each other, said system being equipped with positioning means making it possible to determine, in real time, the instantaneous position of each of the receivers, and said calculation unit making it possible to reconstruct a sonar image by taking account of instantaneous positions of each receiver, wherein the deformable flexible antenna is connected to the rear of a towed head, said head being provided with an inertial unit adapted to determine the instantaneous position and orientation of said head and the system comprises inside the physical antenna at least one transmitter, the deformable flexible antenna being equipped with sensors making it possible to determine a relative instantaneous position of the transmitter and of each transducer with respect to the head and in that said calculation unit makes it possible to form a synthetic antenna by considering a succession of K operation recurrences of the sonar system.

2. The system according to claim 1, wherein said instantaneous position of a receiver is given by three positioning coordinates and three angular orientation coordinates.

3. The system according to claim 2, wherein said deformable flexible antenna includes more than 24 receivers and has a length greater than or equal to 2 m.

4. The system according to claim 2, wherein said flexible physical antenna (3) comprises a plurality of N sections (6j) coupled one after the other by ball joints (7j), each section being provided with a transducer (8j).

5. The system according to claim 2, wherein said flexible physical antenna (3) comprises a plurality of sections inserted in a flexible tube or sheath (15), each section being provided with a transducer (8j).

6. The system according to claim 2, wherein said flexible physical antenna (3) comprises a streamer, said streamer comprising a lower cable (16) and an upper cable (16') fastened to said head (4), the transducers being carried by the lower cable (16), and a floating anchor (17) fastened at the end of said streamer.

7. The system according to claim 1, wherein said deformable flexible antenna includes more than 24 receivers and has a length greater than or equal to 2 m.

8. The system according to claim 7, wherein said flexible physical antenna (3) comprises a plurality of N sections (6j) coupled one after the other by ball joints (7j), each section being provided with a transducer (8j).

9. The system according to claim 7, wherein said flexible physical antenna (3) comprises a plurality of sections inserted in a flexible tube or sheath (15), each section being provided with a transducer (8j).

10. The system according to claim 7, wherein said flexible physical antenna (3) comprises a streamer, said streamer comprising a lower cable (16) and an upper cable (16') fastened to said head (4), the transducers being carried by the lower cable (16), and a floating anchor (17) being fastened at the end of said streamer.

11. The system according to claim 1, wherein said flexible physical antenna (3) comprises a plurality of N sections (6j) coupled one after the other by ball joints (7j), each section being provided with a transducer (8j).

12. The system according to claim 1, wherein said flexible physical antenna (3) comprises a plurality of sections inserted in a flexible tube or sheath (15), each section being provided with a transducer (8j).

13. The system according to claim 1, wherein said flexible physical antenna (3) comprises a streamer, said streamer comprising a lower cable (16) and an upper cable (16') fastened to said head (4), the transducers being carried by the lower cable (16), and a floating anchor (17) being fastened at the end of said streamer.

* * * * *